(Model.)

D. T. HOPGOOD.
WATER GATE.

No. 322,607. Patented July 21, 1885.

WITNESSES:
John H. Deemer
C. Sedgwick

INVENTOR:
D. T. Hopgood
BY Munn & Co.
ATTORNEYS.

United States Patent Office.

DANIEL T. HOPGOOD, OF MORGANFIELD, KENTUCKY.

WATER-GATE.

SPECIFICATION forming part of Letters Patent No. 322,607, dated July 21, 1885.

Application filed October 11, 1884. (Model.)

*To all whom it may concern:*

Be it known that I, DANIEL THOMAS HOPGOOD, of Morganfield, in the county of Union and State of Kentucky, have invented a new and Improved Water-Gate, of which the following is a full, clear, and exact description.

The object of my invention is to prevent the opening of water-gates by live stock, and keep the animals from entering adjacent lands.

The invention consists in a hinged gate and a horizontally-pivoted fender at the up-stream side, the said gate and fender being so connected together that the fender will be opened by the gate as the latter is opened by the rising of the water.

The invention also consists in the peculiar construction and arrangement of parts, as hereinafter fully described, and pointed out in the claims.

Reference is to be had to the accompanying drawings, forming part of this specification, in which similar letters of reference indicate corresponding parts in both the figures.

Figure 1:
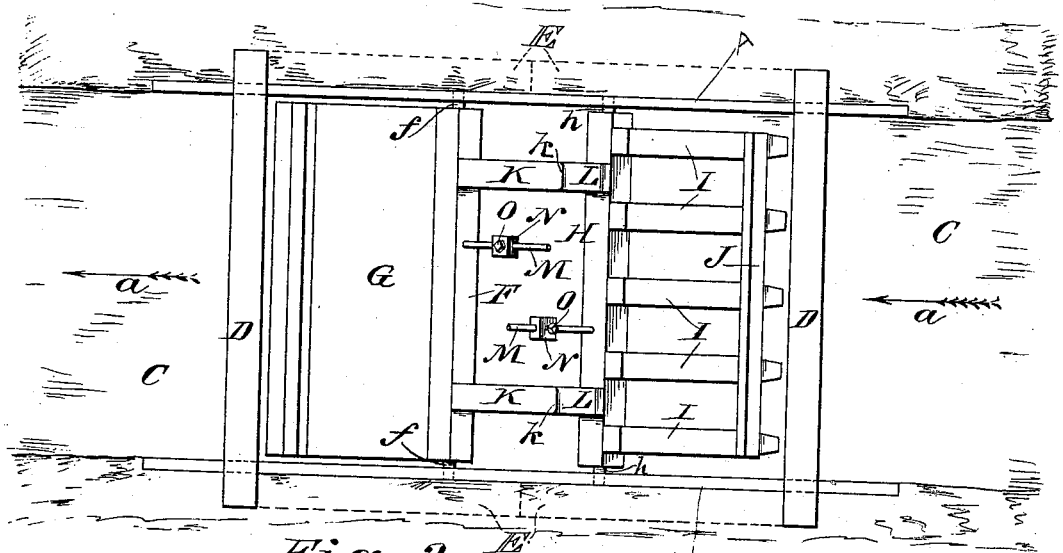
Figure 2:
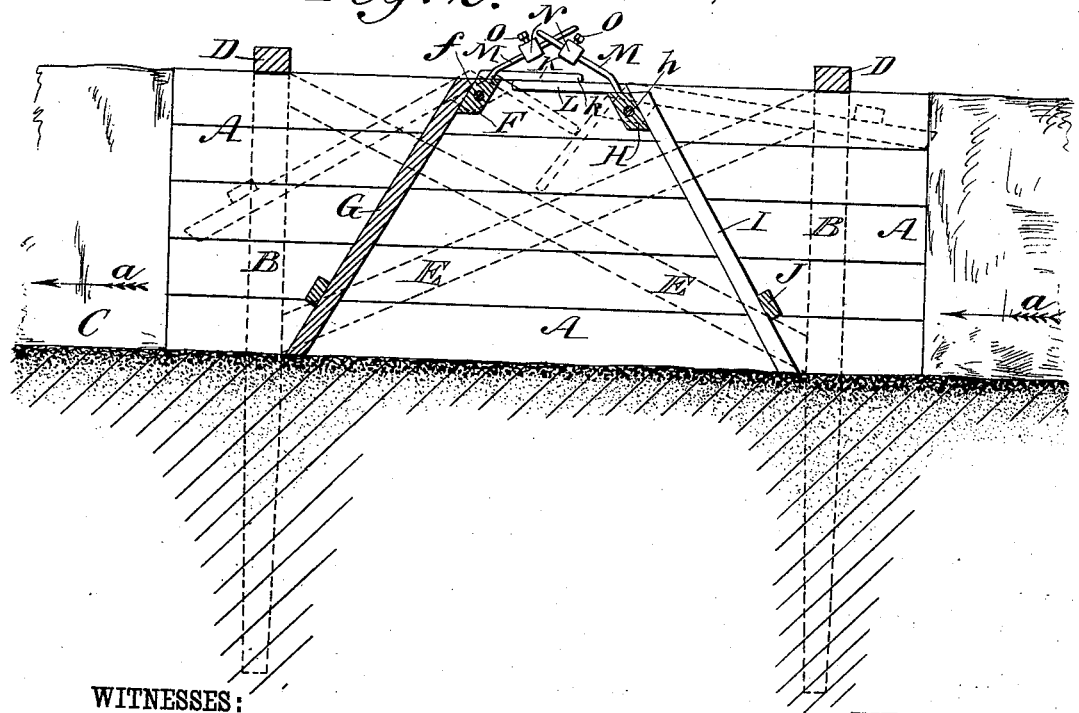

Figure 1 is a plan view of my improved water-gate, and Fig. 2 is a longitudinal sectional elevation of the gate.

The letters A A indicate the plank or timber side walls, between which my water-gate is fitted. I show the walls A secured to posts B, set at the opposite banks of the stream or water-course C, and tied together by cross-beams D, and I prefer to strengthen the walls A by diagonal crossed braces E, (shown in dotted lines.)

To a cross-beam, F, which is pivoted in the walls A A at $f$, is fastened the ordinary water-gate G, which inclines outward toward the bottom of the stream C, and so as to be opened upward by the water flowing in the direction of the arrows $a$.

A cross-beam, H, is pivoted at $h$ in the walls A A, and to it are fixed the bars I, which are or may be tied and braced together near their lower ends by a cross bar or slat, J, said parts H I J constituting a fender or guard, which inclines downward and up stream toward the bottom, and so as to open upward from the gate G and allow the water to flow freely through it. The gate G has fixed to it the arms or bars K, which extend toward the fender and overlap arms or bars L, fixed to the head of the fender, so that as the gate G is floated open by the rising stream the bars K will act on the bars L to swing up the fender, as shown in dotted lines in Fig. 2. It will be seen that the extreme ends $k$ of the bars K first act on the bars L quite near the pivots $h$ of the fender, so that as the gate G opens the fender will open or rise much faster, the fender being thereby fully opened when the gate G is open about half-way, and as drift-wood or other floating objects pass down stream only at quite high water, it is evident that as the gate G is opened by the flood the fender will be lifted sufficiently above the water-level to allow the drift-wood to pass below it. Hence the fender will not be damaged by floating objects, which also may freely pass down stream, and when the water-level falls the fender will fall or swing down in front of the gate and effectually prevent it from being opened by live stock, which will thus be kept from entering adjacent lands.

Ordinarily the gate G will be floated promptly by the rising water to lift the fender clear of floating objects; but to make the movements of gate and fender more positive I attach a rod, M, to the gate, or to both the gate and fender, as shown, and on the rod or rods M, I place a weight or weights, N, which may be fixed to the rods, or may be held thereto by screws O, allowing the weights to be adjusted along the rods, partly to balance the gate G, or the gate G and fender H I J, so that the gate will be more easily floated open by the water to lift the fender, as will readily be understood.

If desired, a single bar, K, may be fixed to the gate, so as to work on an opposite bar, L, fixed to the fender; but opposite pairs of bars, K K and L L, near each end of the gate, are preferred.

My improved water-gate is simple in construction, is not liable to get out of order, and may be made and set up at low cost by any farmer or unskilled workman, and is efficient and practical for its purposes.

I am aware that a flood-gate composed of two connected gates arranged one above the other and hinged at opposite ends is old, and I am also aware that weights have been used for counterbalancing gates; and I therefore do not claim such inventions.

Having thus described my invention, what

I claim as new, and desire to secure by Letters Patent, is—

1. A water-gate comprising a hinged float-gate and a horizontally-pivoted fender at the up-stream side, and connections from said fender to the float-gate for opening the fender as the float-gate is opened by the rising water, substantially as herein set forth.

2. A water-gate comprising a horizontally-pivoted float-gate, a horizontally-pivoted fender at its up-stream side, and a bar fixed to the float-gate and overlapping a bar fixed to the fender for lifting the fender as the float-gate opens, substantially as herein shown and described.

3. A water-gate comprising a horizontally-pivoted float-gate, a horizontally-pivoted fender at its up-stream side, a bar fixed to the float-gate overlapping a bar fixed to the fender, and counterbalance-weights attached to the float-gate and fender, substantially as herein set forth.

DANIEL T. HOPGOOD.

Witnesses:
JOHN D. HOPGOOD,
JOHN M. YOUNG.